(12) United States Patent
Hachisuka (10) Patent No.: US 12,252,065 B2
(45) Date of Patent: Mar. 18, 2025

(54) VEHICLE CONTROL DEVICE

(71) Applicant: TOYOTA JIDOSHA KABUSHIKI KAISHA, Toyota (JP)

(72) Inventor: Motoaki Hachisuka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 18/115,343

(22) Filed: Feb. 28, 2023

(65) Prior Publication Data

US 2023/0278483 A1 Sep. 7, 2023

(30) Foreign Application Priority Data

Mar. 7, 2022 (JP) ................................. 2022-034582

(51) Int. Cl.
*B60Q 1/08* (2006.01)
*G06V 20/58* (2022.01)

(52) U.S. Cl.
CPC ........... *B60Q 1/085* (2013.01); *G06V 20/582* (2022.01); *B60Q 2300/05* (2013.01); *B60Q 2300/45* (2013.01)

(58) Field of Classification Search
CPC B60Q 1/085; B60Q 2300/05; B60Q 2300/45; G06V 20/582
See application file for complete search history.

(56) References Cited

U.S. PATENT DOCUMENTS

| | | | |
|---|---|---|---|
| 9,731,645 B1* | 8/2017 | Taleb-Bendiab | H05B 47/19 |
| 10,759,329 B2 | 9/2020 | Morimura | |
| 10,946,791 B2 | 3/2021 | Morimura | |
| 11,260,789 B2 | 3/2022 | Morimura | |
| 2008/0084286 A1* | 4/2008 | Teramura | B60Q 1/085 |
| | | | 340/463 |
| 2009/0016073 A1* | 1/2009 | Higgins-Luthman | |
| | | | B60Q 1/085 |
| | | | 362/465 |
| 2013/0343071 A1* | 12/2013 | Nagaoka | B60Q 1/085 |
| | | | 362/466 |
| 2015/0003087 A1* | 1/2015 | Futamura | B60Q 9/008 |
| | | | 362/466 |
| 2018/0099604 A1* | 4/2018 | Mouri | B60Q 1/085 |
| 2018/0137375 A1* | 5/2018 | Takemura | H04N 23/75 |
| 2020/0150702 A1 | 5/2020 | Ueda | |
| 2022/0203888 A1* | 6/2022 | Tanimura | B60Q 1/535 |

FOREIGN PATENT DOCUMENTS

JP 2015063209 A 4/2015

* cited by examiner

*Primary Examiner* — Mohamed Barakat
(74) *Attorney, Agent, or Firm* — Dinsmore & Shohl LLP (57) ABSTRACT

A vehicle control device for controlling illumination of a headlight of a vehicle. The vehicle control device determines whether a preset illumination target approach area condition is satisfied, detects an illumination target including a pedestrian in front of the vehicle by increasing a horizontal width of an illumination range of the headlight compared to a case where the illumination target approach area condition is not satisfied when the illumination target approach area condition is determined to be satisfied, and perform spot illumination of the illumination target by the headlight when the illumination target is detected.

4 Claims, 6 Drawing Sheets

IMAGE OF THE CROSS SECTION OF THE IRRADIATED AREA AT 1M HEIGHT

VEHICLE CONTROL DEVICE

CROSS-REFERENCE TO RELATED APPLICATIONS

This application is based upon and claims the benefit of priority from Japanese Patent Application No. 2022-034582, filed on Mar. 7, 2022. The entire contents of which are incorporated herein by reference.

TECHNICAL FIELD

The present disclosure relates to a vehicle control device.

BACKGROUND

Japanese Patent Application Laid-Open No. 063209/2015 discloses a vehicle control device. In this publication, it is indicated that in an intersection where a traffic light exists, the illumination range and the light amount of the headlight are adjusted in accordance with the signal color of the traffic light.

SUMMARY

However, according to the related art described above, the illumination range is determined after the signal color of the traffic light is recognized. Therefore, the illumination range is not adjusted until the signal color of the traffic light can be recognized by the camera. As a result, according to the related art, a driver may fails to see a pedestrian or the like.

According to an aspect of the present disclosure, there is provided a vehicle control device for controlling illumination of a headlight of a vehicle. The vehicle control device includes a condition determination unit configured to determine whether a preset illumination target approach area condition is satisfied based on location information of the vehicle on a map and map information or based on a captured image of a front camera of the vehicle and a preset area determination image pattern and an illumination range control unit configured to increase a horizontal width of an illumination range of the headlight when the condition determination unit determines that the illumination target approach area condition is satisfied compared to when the condition determination unit does not determine that the illumination target approach area condition is satisfied. The vehicle control device includes an illumination target detection unit configured to detect an illumination target including a pedestrian in front of the vehicle based on the captured image of the front camera of the vehicle or the detection result of a radar sensor of the vehicle and a spot illumination control unit configured to perform spot illumination with respect to the illumination target by the headlight when the illumination target is detected by the illumination target detection unit.

With the vehicle control device according to the aspect of the present disclosure, the horizontal width of the illumination range of the headlight is increased when the vehicle enters an area where the illumination target such as a pedestrian is highly likely to approach and the illumination target approach area condition is satisfied. In addition, when the vehicle control device detects an illumination target such as a pedestrian, spot illumination is performed with respect to the illumination target. Therefore, the vehicle control device makes it possible to reduce the chances of the driver failing to see the pedestrian of the driver at night by controlling the headlight. As a result, the vehicle control device can alleviate the driver's feeling of unease in driving at night. Further, the vehicle control device also makes it easier for an illumination target receiving spot illumination having with a large amount of light to notice the presence of the vehicle.

The vehicle control device according to the aspect of the present disclosure may further include a collision possibility determination unit configured to determine whether a collision possibility between the vehicle and the illumination target is high based on the captured image of the front camera of the vehicle or a detection result of a radar sensor of the vehicle when the illumination target is detected by the illumination target detection unit. The spot illumination control unit increases the amount of light of the spot illumination with respect to the illumination target when the collision possibility determination unit determines that the collision possibility between the vehicle and the illumination target is high compared to when the collision possibility determination unit does not determine that the collision possibility between the vehicle and the illumination target is high.

In the vehicle control device according to the aspect of the present disclosure, the condition determination unit may determine that the illumination target approach area condition is satisfied when recognizing that the vehicle is located within the illumination target approach area set on a map.

In the vehicle control device according to the aspect of the present disclosure, the condition determination unit may determine that the illumination target approach area condition is satisfied for a predetermined period of time after recognizing a road sign or a road marking corresponding to the area determination image pattern from the captured image of the front camera or for a period of time after a road sign or road marking corresponding to the area determination image pattern has been recognized from the captured image of the front camera until the vehicle travels a predetermined distance.

According to the aspect of the present disclosure, the control of the headlight can reduce the chance of the driver failing to see the illumination target such as a pedestrian at night.

DETAILED DESCRIPTION

Hereinafter, embodiments of the present disclosure will be described with reference to the drawings.

Figure 1:
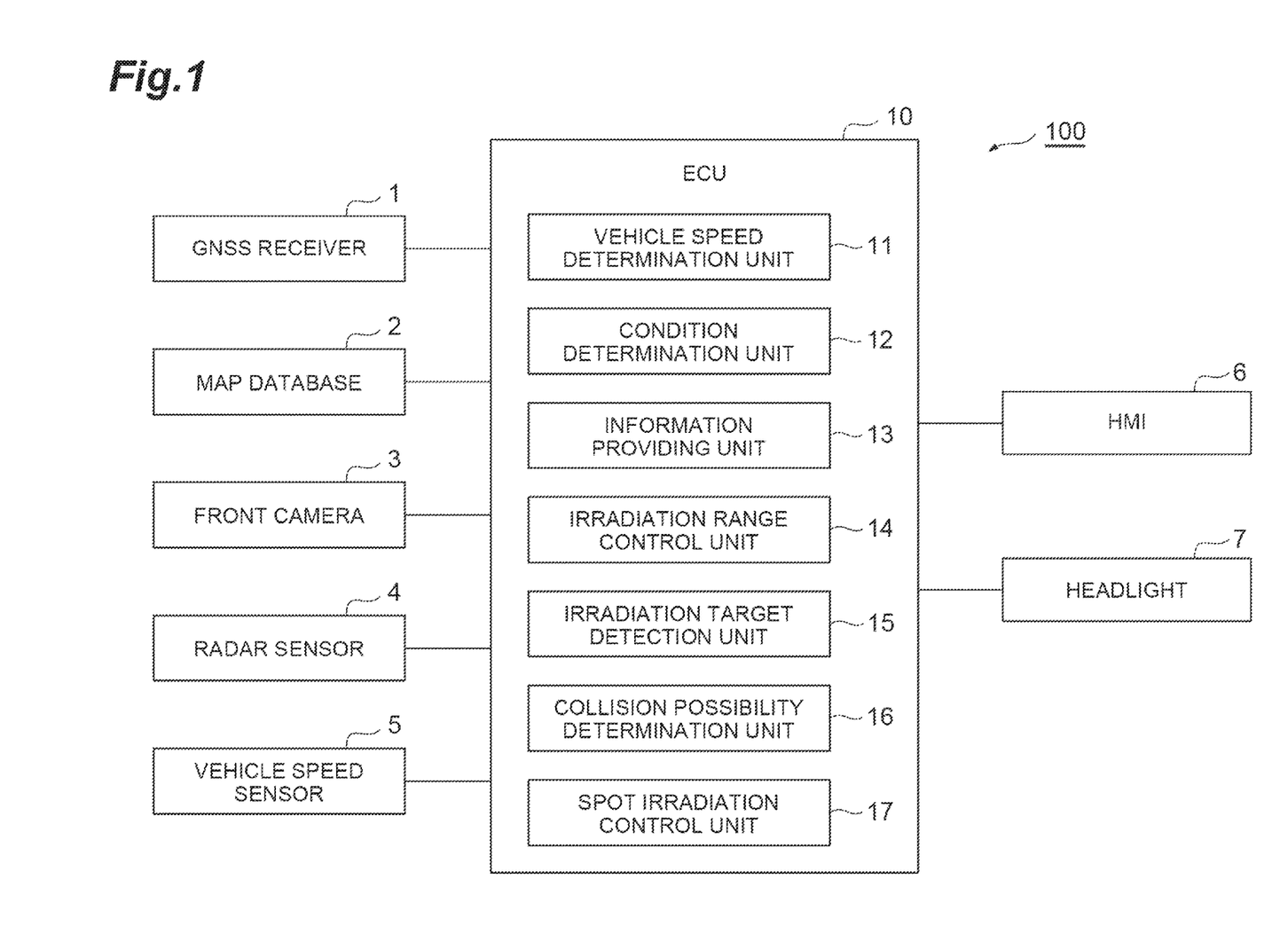
FIG. 1 is a block diagram illustrating an example of a vehicle control device according to an embodiment.

A vehicle control device 100 shown in FIG. 1 is a device which is mounted on a vehicle such as a passenger car or a cargo car and controls illumination of a headlight of the vehicle. The vehicle control device 100 performs headlight illumination control in accordance with the presence or absence of an illumination target, an area where the illumination target is highly likely to approach the vehicle, or the like.

The illumination target is an object that is desired to be visually recognized by the driver by illumination of the headlight of the vehicle at night. The illumination target includes at least a pedestrian. The illumination target may include a bicycle, may include a wheelchair or personal mobility, or may include an animal such as dog or deer. The illumination target may include road sign or road marking.

Configuration of Vehicle Control Device

The configuration of the vehicle control device 100 according to the present embodiment will be described with reference to the drawings. As shown in FIG. 1, the vehicle control device 100 includes an ECU (Electronic Control Unit) 10 that integrally manages the apparatus. The ECU 10 is an electronic control unit including a central processing unit (CPU) and a storage unit such as a read only memory (ROM) or a random access memory (RAM). In the ECU 10, for example, various functions are realized by executing a program stored in the storage unit by the CPU. The ECU 10 may be composed of a plurality of electronic units.

The ECU 10 is connected to the GNSS receiver 1, a map database 2, a front camera 3, a radar sensor 4, a vehicle speed sensor 5, HMI 6, and a headlight 7. The GNSS is a global navigation satellite system. The HMI is a human machine interface.

The GNSS receiver 1 measures the position of the vehicle by receiving signals from positioning satellites. The position of the vehicle is, for example, the latitude and longitude of the vehicle. The GNSS receiver 1 transmits the measured position information of the vehicle to the ECU 10.

The map database 2 is a database that stores map information. The map database 2 is, for example, a hard disk drive (HDD) mounted on a vehicle. It is formed in a storage device such as the like. The map information includes position information of roads and intersections. Note that the map database 2 may be formed not in the vehicle but in a sever capable of communicating with the vehicle.

In map information, illumination target approach area is set. The illumination target approach area is an area in which the illumination target is considered to be likely to approach the vehicle. The illumination target approach area may include an area where the vehicle speed is limited to a low speed, and may include an intersection or the vicinity of the intersection. The area where the vehicle speed is limited to a low speed is, for example, a zone 30 in Japan.

The illumination target approach area may include an urban area or may include a residential area. The illumination target approach area may include an area in which a speed limit is set by a law or a rule in a country or a region. The illumination target approach area may include an area (section) within a predetermined distance from a pedestrian crossing provided on a straight line. The illumination target approach area may include, as a contact case occurrence area, a road section in which the number of contact cases within a predetermined period is equal to or greater than a predetermined threshold value based on big data of contact cases between a pedestrian and a bicycle associated with positional information and a vehicle.

The front camera 3 is an imaging device that images an area in front of the vehicle. The front camera 3 is provided, for example, on the windshield of the vehicle, for example, and captures an image in front of the vehicle. The front camera 3 transmits the captured image in front of the vehicle to the ECU 10.

The radar sensor 4 is a detection device that detects an object around the host vehicle using radio waves such as millimeter waves or light. The radar sensor 4, for example, includes a millimeter wave radar or a light detection and ranging (LIDAR). The radar sensor 4 detects an object by transmitting radio waves or light to the surroundings of the host vehicle and receiving radio waves or light reflected by the object. The radar sensor 4 transmits information of the detected object to the ECU 10. Examples of the object include a fixed obstacle such as a guardrail or a building and a moving obstacle such as a pedestrian, a bicycle, or another vehicle.

The vehicle speed sensor 5 is a detector that detects the speed of the vehicle. As the vehicle speed sensor 5, for example, a wheel speed sensor that detects a rotation speed of a wheel is used. In this case, the vehicle speed sensor 5 is provided on a wheel of the vehicle or a drive shaft that rotates integrally with the wheel. The vehicle speed sensor 5 transmits the detected vehicle speed information to the ECU 10.

The HMI 6 is an interface for inputting and outputting information between the vehicle control device 100 and the driver. The HMI 6 includes, for example, an indicator, a display, and a speaker. The display is a head-up display (HUD) that projects an image on a windshield. The HMI 6 turns on an indicator, outputs an image on a display, and outputs sound from a speaker based on a control signal from the ECU 10. The HMI 6 may include vibratory actuators that vibrate the steering wheel or driver's seat. The HMI 6 can provide information to the driver by a combination of images, sounds, and vibrations.

The headlight 7 is an illumination unit that illuminates the front of the vehicle. The headlight 7 has a light source and an illumination adjustment device for adjusting the illumination of light. The light source may be light emitting diodes (LED). The illumination adjustment device may be a lens or a reflecting mirror. The headlight 7 can switch between a low beam and a high beam. The low beam is a mode of illuminating a slightly lower portion in front of the vehicle. The high beam is a mode of illuminating more widely in the horizontal direction than the low beam in front of the vehicle.

The headlight 7 switches between normal light distribution and wide light distribution in response to a control signal from the ECU 10. The headlight 7 switches the high beam between the normal light distribution and the wide light distribution. The headlight 7 may not switch between the normal light distribution and the wide light distribution in a case where the high beam is not performed. Note that switching between a general low beam and a general high beam does not correspond to switching between normal light distribution and wide light distribution.

Figure 2A:
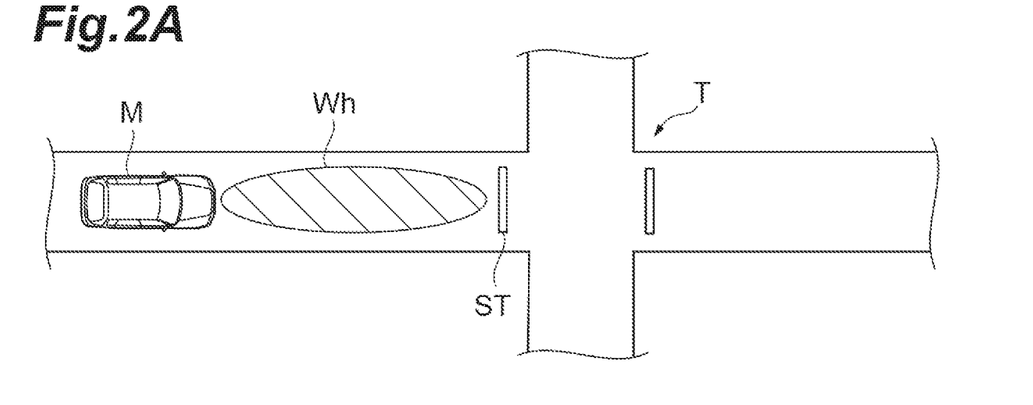
FIG. 2A is a plan view illustrating an example of an illumination range of a headlight of a vehicle before approaching an intersection.
Figure 2B:
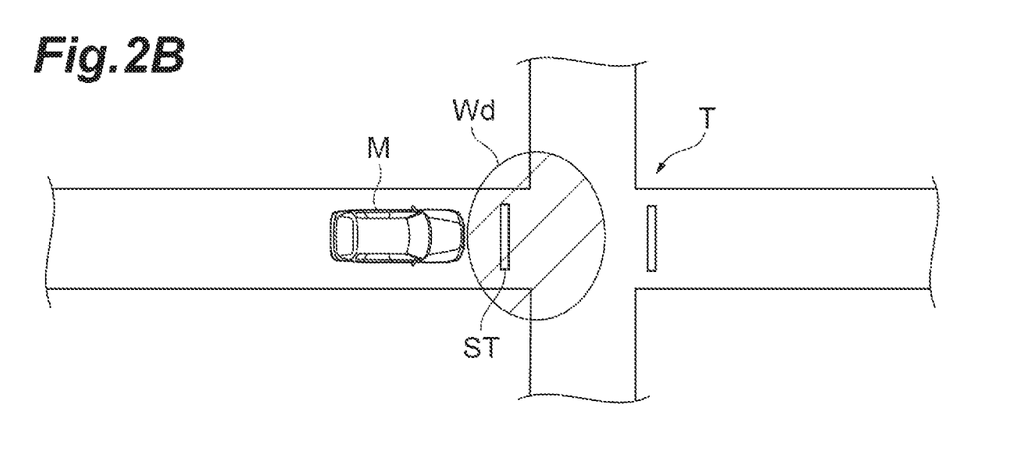
FIG. 2B is a plan view illustrating an example of the illumination range of the headlight of the vehicle when the intersection is approached.
Figure 2C:
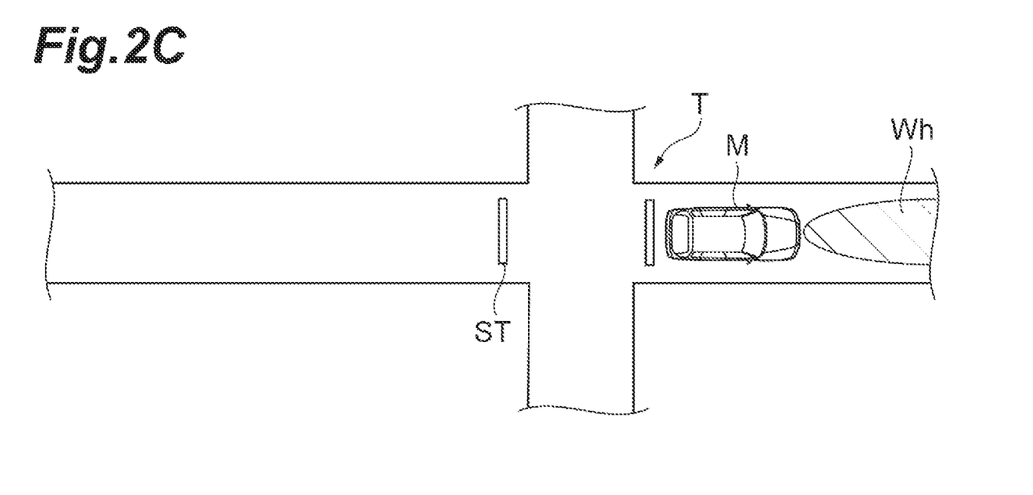
FIG. 2C is a plan view illustrating an example of the illumination range of the headlight of the vehicle after passing through the intersection.

Here, FIG. 2A is a plan view showing an example of the illumination range (normal light distribution) of the headlight of the vehicle before approaching the intersection. FIG. 2A shows a vehicle M, an illumination range Wh with normal light distribution, an intersection T, and a stop line ST. FIG. 2B is a plan view showing an example of the illumination range (wide light distribution) of the headlight of the vehicle when approaching the intersection. FIG. 2B shows an illumination range Wd of the wide light distribution. As shown in FIG. 2A and FIG. 2B, the wide light distribution is a light distribution state in which the lateral width of the illumination range of the headlight 7 is enlarged compared to the normal light distribution. The width of the illumination range corresponds to the width in the lateral direction of the vehicle. FIG. 2C will be described later.

Figure 3:
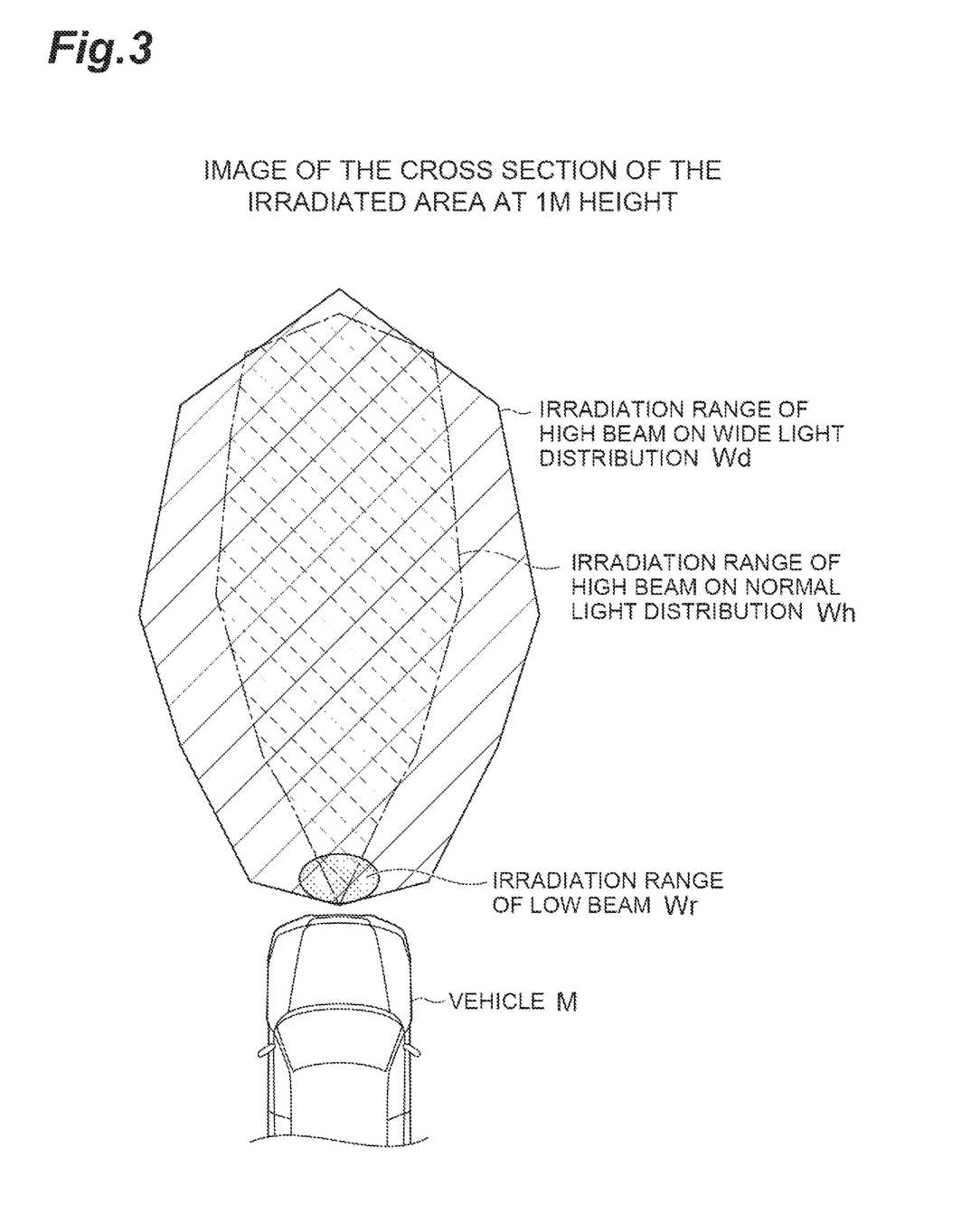
FIG. 3 is a diagram for explaining a difference between wide light distribution and normal light distribution at a height of 1 m.

Further, in the wide light distribution, an illumination range in which the amount of light is 10 lux or more in the cross section at the height of the 1 m is enlarged in the lateral direction compared to the normal light distribution. FIG. 3 is a diagram for explaining a difference between wide light distribution and normal light distribution at the height of 1 m. FIG. 3 shows the illumination range Wd of high beam on wide light distribution, the illumination range Wh of high beam on normal light distribution, and an illumination range Wr of low beam. Each illumination range is a range in which the amount of light is 10 lux or more. As shown in FIG. 3, in the illumination range Wd of the wide light distribution, the range in which the light amount is 10 lux or more is enlarged in the lateral direction in the cross section at the height of 1 m compared to the illumination range Wh of the normal light distribution. Since the low beam illuminates slightly below in front of the vehicle, the illumination range Wr at the height of 1 m is limited.

Switching from the normal light distribution to the wide light distribution in the headlight 7 is performed by, for example, control of the light source or an illumination adjustment device. The switching from the normal light distribution to the wide light distribution may be performed by using together an illumination device that is not used in the normal light distribution, such as a corner lamp of a vehicle. In this case, in the present embodiment, an illumination device such as a corner lamp is interpreted as a part of the headlight 7.

In addition to the normal illumination function, the headlight 7 has a spot illumination function of executing spot illumination on an illumination target in front of the vehicle. The spot illumination is illuminating an illumination target such as a pedestrian with light as a spot.

Figure 4:
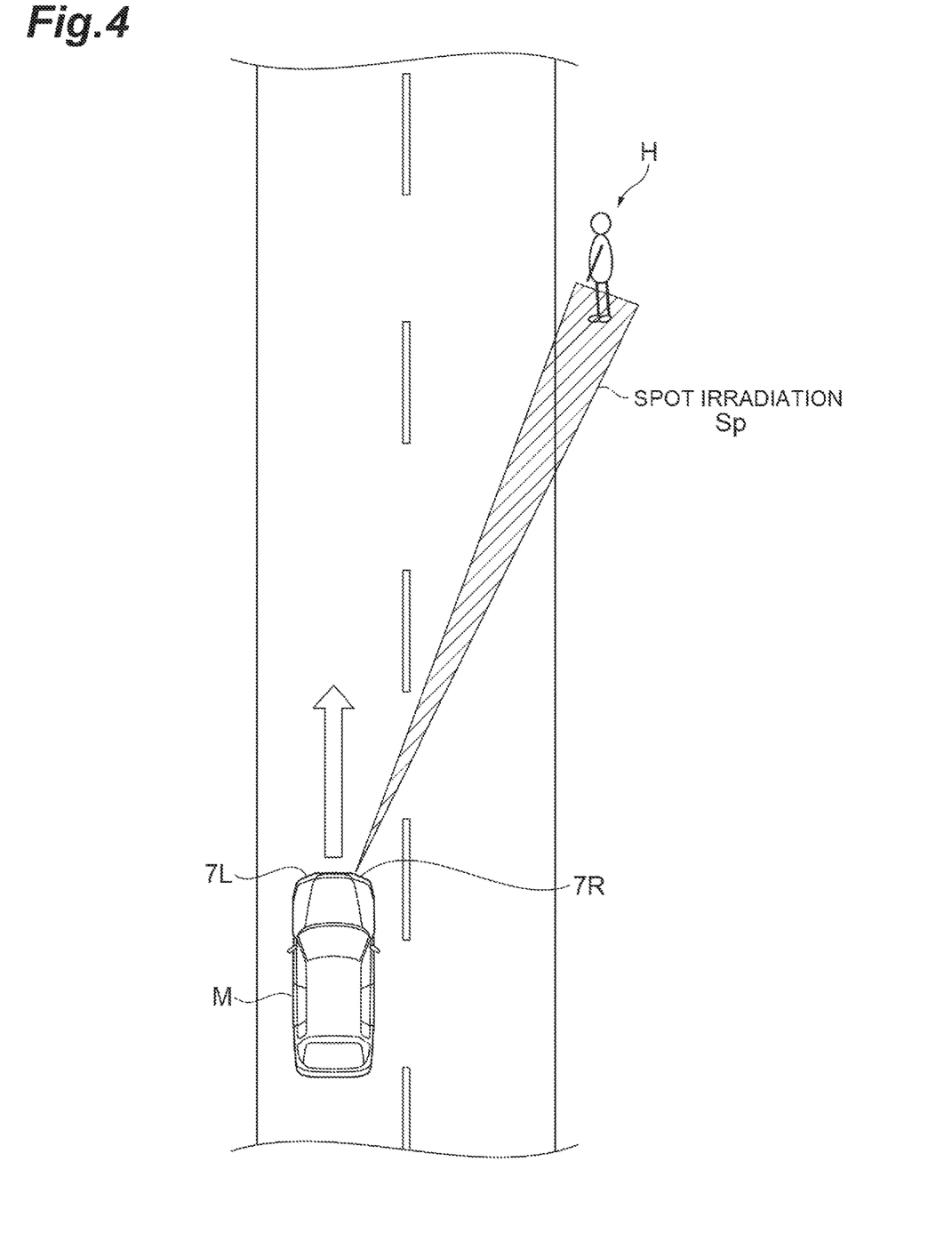
FIG. 4 is a plan view for explaining an example of spot illumination.

FIG. 4 is a plan view for explaining an example of spot illumination. FIG. 4 shows a right headlight 7R of the vehicle M, a left headlight 7L of the vehicle M, pedestrian (illumination target) H, a spot illumination Sp. As shown in FIG. 4, spot illumination is performed on a pedestrian H located on the front right side of the vehicle M by controlling the right headlight 7R of the headlight 7. The spot illumination may be performed as continuous light illumination or may be performed as blinking light illumination. The spot illumination may illuminate the center of the illumination target or may illuminate the lower side of the illumination target (the foot of the pedestrian, etc.).

The headlight 7 can perform spot illumination by controlling, for example, an LED array configured by arranging a plurality of LED units each including a plurality of LED elements. The LED array may be configured by arranging the LED units on a line, or may be configured by arranging the LED units on a plane.

Each of the LED units is configured to be able to independently light. Each LED unit may be configured to be capable of independently adjusting the amount of light. Each LED unit corresponds to a different illumination angle, and performs spot illumination by being turned on by a control signal from the ECU 10. For example, when the illumination target is present at a position of 30° on the right side with respect to the longitudinal axis of the vehicle, the headlight 7 performs spot illumination by turning on the LED unit corresponding to an illumination angle of 30° on the right side according to a control signal from the ECU 10. The spot illumination light source may be different from or the same as the high beam light source or the low beam light source. The configuration of the headlight 7 that realizes spot illumination is not limited to that described above. The headlight 7 may realize spot illumination by controlling the reflector, and other known configurations may be adopted.

Next, a functional configuration of the ECU 10 will be described. ECU 10 has a vehicle speed determination unit 11, a condition determination unit 12, an information providing unit 13, a illumination range control unit 14, an illumination target detection unit 15, a collision possibility determination unit 16, and a spot illumination control unit 17.

The vehicle speed determination unit 11 determines whether or not the vehicle speed of the vehicle is equal to or lower than a predetermined speed based on the vehicle speed information in which the vehicle speed sensor 5 is detected. The predetermined speed is set as a threshold value for determining that the vehicle speed is not high but medium or low. The predetermined speed is not particularly limited, and may be 60 km/h, 70 km/h, or 80 km/h.

The condition determination unit 12 may determine whether a preset illumination target approach area condition is satisfied based on location information of the vehicle on a map and map information or a captured image of the front camera 3 of the vehicle and an area determination image pattern. The position information of the vehicle on the map can be obtained from the position information of the vehicle measured by the GNSS receiver 1 and map information of the map database 2. In map information, an illumination target approach area is set. The illumination target approach area is an area near the zone or an intersection. For example, the patient condition determination unit 12 determines that the illumination target approach area condition is satisfied when recognizing that the vehicle is located within the illumination target approach area set on the map based on the position information of the vehicle on the map and the map information.

The area determination image pattern is an image pattern for recognizing road sign or road marking corresponding to the illumination target approach area. The area determination image pattern includes, for example, an image pattern of road sign or a road marking indicating the zone 30. The area determination image pattern may include an image pattern of road sign or road marking indicating an urban area or a residential area. The area determination image pattern may include an image pattern for recognizing an intersection and may include an image pattern for recognizing a pedestrian crossing.

The condition determination unit 12 recognizes a road sign or road marking corresponding to the area determination image pattern based on the captured image of the front camera 3 of the vehicle and the area determination image pattern. The condition determination unit 12 may determine that the illumination target approach area condition is satisfied for a predetermined period of time after recognizing a road sign or a road marking. The road sign corresponding to the area determination image pattern is, for example, a road sign indicating the zone 30. The road marking corresponding to the area determination image pattern is, for example, road marking indicating the zone 30. The predetermined period of time is not particularly limited. The predetermined period of time may be 5 minutes, 10 minutes, or 15 minutes. The condition determination unit 12 may determine that the illumination target approach area condition is satisfied for a predetermined distance after recognizing a road sign or road marking. The predetermined distance is not particularly limited. The predetermined distance may be 100 m, 300 m, 500 m, or 1 km.

The information providing unit 13 provides information to the driver when it is determined that the illumination target approach area condition is satisfied due to the condition determination unit 12. The information providing unit 13 provides information to the driver before switching the headlight 7 to the wide light distribution or before executing spot illumination. The information providing unit 13 provides information to the driver by lighting the indicator, displaying an image on the display, or outputting sound from the speaker using HMI 6.

For example, when the information providing unit 13 recognizes that the vehicle is located in the zone 30, the driver is notified that the vehicle has entered the zone 30. The information providing unit 13 may notify the driver to switch the headlight 7 to wide light distribution. The information providing unit 13 does not necessarily need to provide information to the driver every time. The information providing unit 13 may be configured not to provide information when it is determined that the illumination target approach area condition is satisfied by the vehicle entering the vicinity of the intersection, for example. This is because there is a high possibility that the driver recognizes the entry into the intersection.

The information providing unit 13 may provide information of a pedestrian to the driver when the information providing unit 13 detects the pedestrian as the illumination target and determines that the collision possibility between the pedestrian and the vehicle is high due to the collision possibility determination unit 16. The collision possibility determination unit 16 will be described later. The information providing unit 13 may provide information about the illumination target by a HUD that projects an image on the windshield of the vehicle.

The illumination range control unit 14 switches the headlight 7 to wide light distribution to increase the horizontal width of the illumination range when it is determined that the illumination target approach area condition is satisfied due to the condition determination unit 12. If it is not determined that the illumination target approach area condition is satisfied due to the condition determination unit 12, the illumination range control unit 14 continues the normal light distribution. The illumination range control unit 14 returns the headlight 7 to normal light distribution when illumination target approach area condition is no longer determined to be satisfied by the condition determination unit 12 after switching the headlight 7 to wide light distribution.

As shown in FIG. 2A, the illumination range control unit 14 continues the high-beam normal light distribution when the vehicle M does not enter the vicinity of the intersection and it is not determined by the condition determination unit 12 that the illumination target approach area condition is satisfied. As illustrated in FIG. 2B, the illumination range control unit 14 switches the headlight 7 to the wide light distribution when it is determined that the vehicle M enters the vicinity of the intersection and the illumination target approach area condition is satisfied. FIG. 2C is a plan view showing an example of the illumination range (normal light distribution) of the vehicle headlight after passing through the intersection. As shown in FIG. 2C, the illumination range control unit 14 returns from the wide light distribution to the normal light distribution when it is not determined that the illumination target approach area condition is satisfied after the vehicle M passes through the intersection.

The illumination range control unit 14 may adjust the illumination range or the amount of light according to the situation of the vehicle. The illumination range control unit 14 may perform a one sided wide light distribution such that the illumination range is increased only on the road shoulder side without increasing the illumination range on the adjacent lane side when the vehicle is traveling on the road shoulder side of a road having a plurality of lanes. The illumination range control unit 14 may perform wide light distribution which the illumination range in the front-rear direction of the vehicle is shorter than that of the normal light distribution when the vehicle is enters the intersection of the T-junction and the front of the vehicle is a wall. The wall also includes a wall formed of snow. In the wide light distribution, a light amount of illumination by the headlight 7 with respect to the front of the vehicle is lower than that of the normal light distribution. Accordingly, it is possible to prevent the visibility of the driver from being reduced by the reflection of the light of the headlight 7 by the wall.

The illumination target detection unit 15 detects an illumination target in front of the vehicle based on the captured image of the front camera 3 or the detection result of the radar sensor 4. The illumination target detection unit 15 detects illumination targets such as pedestrian, road sign, and road marking from pattern matching of a captured image of the front camera 3, shape recognition by grouping of reflection points of the radar sensor 4, and the like. The illumination target detection unit 15 may detect the illumination target when the distance between the vehicle and the illumination target is less than a predetermined value. The fixed distance can be set according to the distance of spot illumination, for example. Note that road sign and road marking as illumination target are not limited to those related to illumination target approach area.

The collision possibility determination unit 16 determines whether the collision possibility between the vehicle and the illumination target is high when the illumination target is detected due to the illumination target detection unit 15. The collision possibility determination unit 16 determines whether or not the collision possibility between the vehicle and the illumination target is high based on the captured image of the front camera 3 or the detection result of the radar sensor 4. The collision possibility determination unit 16 may be a mode in which the collision possibility is not determined when the illumination target is a stationary object such as road sign or road marking.

The collision possibility determination unit 16 is, for example, a time to collision (TTC) between the vehicle and the illumination target. Is less than the collision determination threshold value, it is determined that the collision possibility between the vehicle and the illumination target is high. The collision possibility determination unit 16 may use distances instead of time-to-collision.

The spot illumination control unit 17 performs spot illumination of the headlight 7 with respect to the illumination target when the illumination target is detected by the illumination target detection unit 15 (see FIG. 4). The spot illumination control unit 17 performs spot illumination on the illumination target by turning on an LED unit corresponding to an illumination angle corresponding to the position of the illumination target, for example.

The spot illumination control unit 17 performs spot illumination with an increased light amount on the illumination target compared to a case where it is not determined that the collision possibility between the vehicle and the illumination target is high when it is determined that the collision possibility between the vehicle and the illumination target is high due to the collision possibility determination unit 16. The spot illumination control unit 17 performs spot illumination with a normal light amount when it is not determined that the collision possibility between the vehicle and the illumination target is high.

Processing of Vehicle Control Device

Figure 5A:
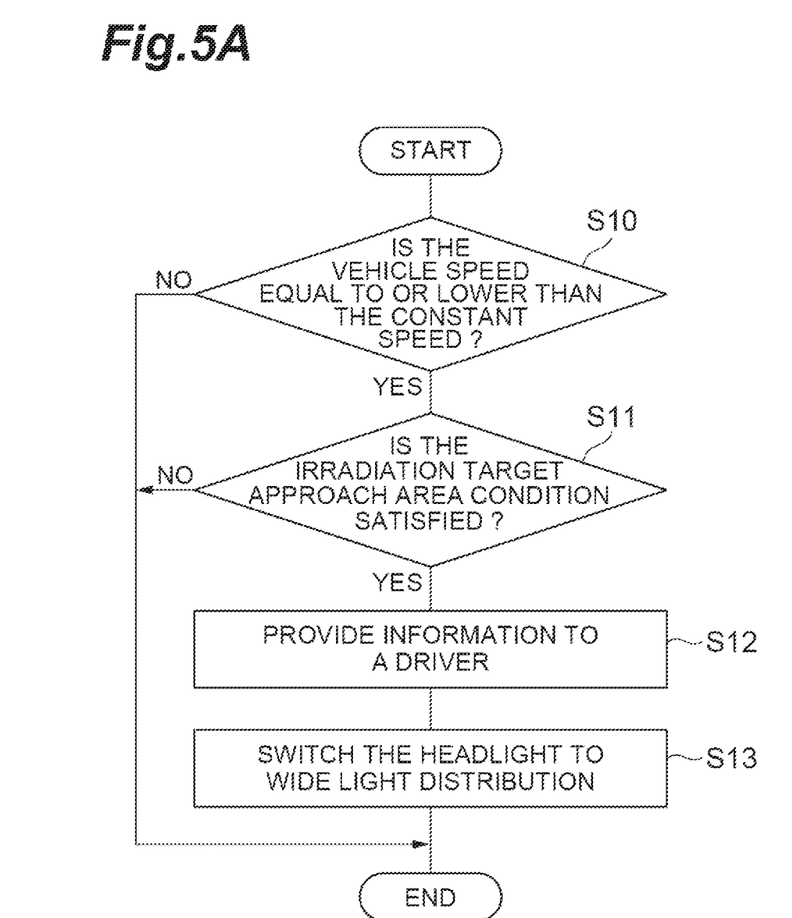
FIG. 5A is a flowchart illustrating an example of wide light distribution switching.

Next, the processing of the vehicle control device 100 according to the present embodiment will be described with reference to the drawings. FIG. 5A is a flowchart illustrating an example of the wide light distribution switching. The wide light distribution switching processing is performed when the high beam of the headlight 7 of the vehicle is lit with the normal light distribution and the driver permits the wide light distribution switching.

As shown in FIG. 5A, the ECU 10 of the vehicle control device 100 is determined whether or not the vehicle speed is equal to or lower than the predetermined speed by the vehicle speed determination unit 11 as S10. The vehicle speed determination unit 11 makes a determination based on the speed of the vehicle speed sensor 5. When it is determined that the vehicle speed is equal to or lower than the predetermined speed (YES in S10), the ECU 10 transitions to S11. When it is not determined that the vehicle speed is equal to or lower than the predetermined speed (NO in S10), the ECU 10 determines that the vehicle is traveling at a high speed, and ends the wide light distribution switching processing without switching to the wide light distribution. Thereafter, the ECU 10 repeats the process again from S10 after a predetermined period of time has elapsed.

In S11, the ECU 10 determines whether the illumination target approach area condition is satisfied by the condition determination unit 12. The condition determination unit 12 is determined based on position information of the vehicle on a map and map information, or a captured image of the front camera 3 of the vehicle and an area determination image pattern. When it is determined that the illumination target approach area condition is satisfied (YES in S11), the ECU 10 transitions to S12. When it is not determined that the illumination target approach area condition is satisfied (NO in S11), the ECU 10 ends the wide light distribution switching processing. Thereafter, the ECU 10 repeats the process again from S10 after a predetermined period of time has elapsed.

In S12, the ECU 10 provides information to a driver by the information providing unit 13. The information providing unit 13 provides information to the driver by lighting an indicator of HMI 6, displaying an image on a display of HMI 6, or outputting sound from a speaker of HMI 6. For example, the information providing unit 13 notifies the driver that the vehicle has entered an illumination target approach area (the zone 30 or the like). The ECU 10 then transitions to S13.

In S13, ECU 10 switches the headlight 7 to wide light distribution by the illumination range control unit 14. The illumination range control unit 14 performs switching to wide light distribution in which the lateral width of the illumination range is increased compared to normal light distribution by controlling the headlight 7. Thereafter, the ECU 10 ends the current wide light distribution switching processing.

Figure 5B:
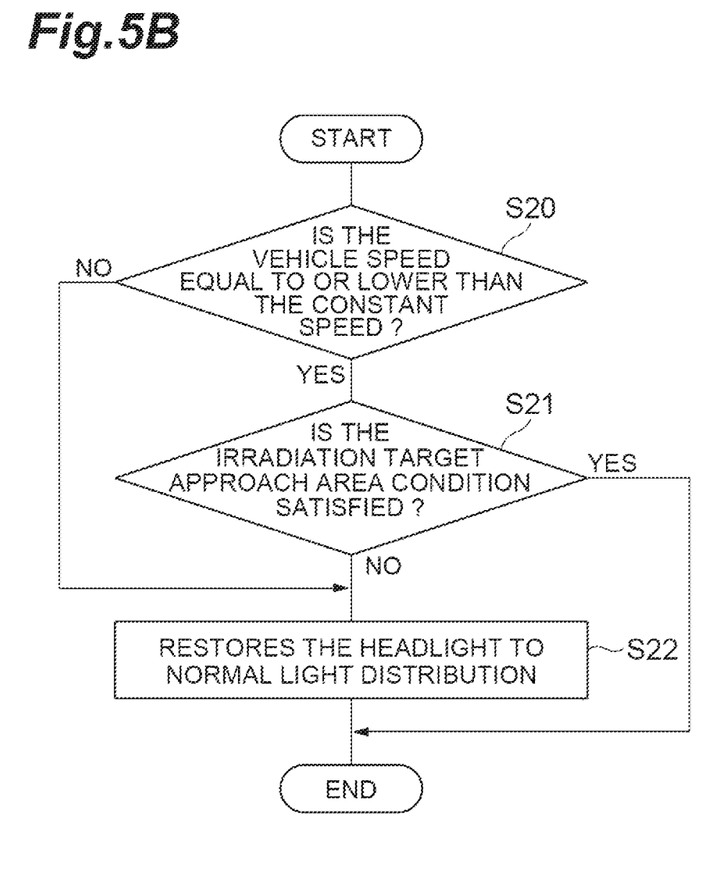
FIG. 5B is a flowchart illustrating an example of normal light distribution return processing.

FIG. 5B is a flowchart illustrating an example of the normal light distribution return processing. The normal light distribution return processing is performed when the headlight 7 is switched to the wide light distribution in the wide light distribution switching processing illustrated in FIG. 5A.

As illustrated in FIG. 5B, the ECU 10 determines whether or not the vehicle speed is equal to or lower than a predetermined speed due to the vehicle speed determination unit 11 as S20. When it is determined that the vehicle speed is equal to or lower than the predetermined speed (YES in S20), the ECU 10 transitions to S21. When it is not determined that the vehicle speed is equal to or lower than the predetermined speed (NO in S20), the ECU 10 transitions to S22.

In S21, the ECU 10 determines whether the illumination target approach area condition is no longer satisfied due to the condition determination unit 12. When it is not determined that the illumination target approach area condition is satisfied (NO in S21), the ECU 10 transitions to S22. When it is determined that the illumination target approach area condition is satisfied (YES in S21), the ECU 10 ends the normal light distribution return processing. Thereafter, the ECU 10 repeats the process from S20 after a predetermined period of time has elapsed.

In S22, ECU 10 restores the headlight 7 to normal light distribution by the illumination range control unit 14. Thereafter, the ECU 10 ends the current normal light distribution return processing.

Figure 6:
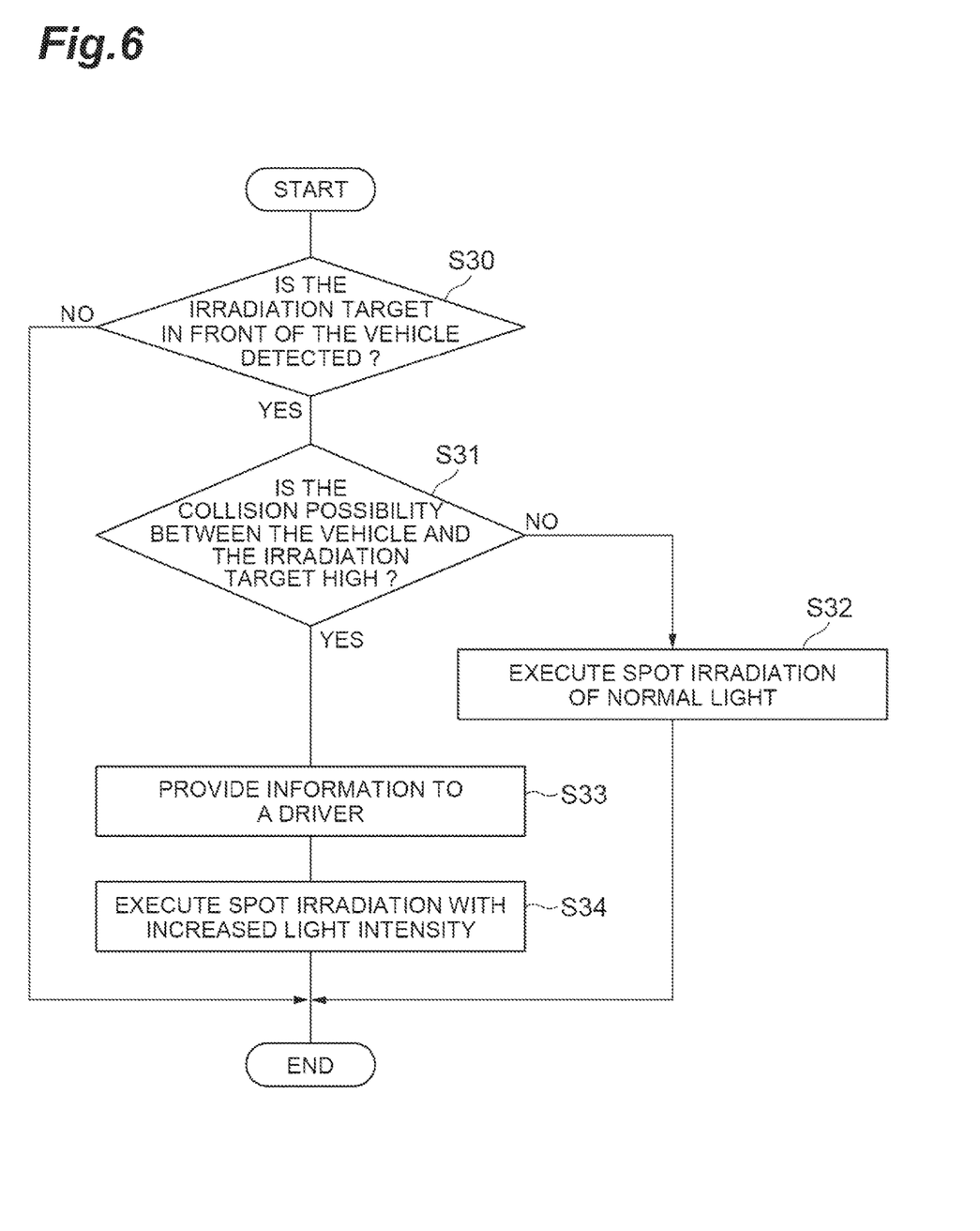
FIG. 6 is a flowchart illustrating an example of spot illumination process.

FIG. 6 is a flowchart showing an example of the spot illumination processing. The spot illumination processing is performed when the headlight 7 of the vehicle is turned on and the driver permits spot illumination. Lighting includes lighting of both a high beam and a low beam.

As shown in FIG. 6, the ECU 10 determines whether or not the illumination target in front of the vehicle is detected by the illumination target detection unit 15 as S30. The illumination target detection unit 15 detects an illumination target in front of the vehicle based on the captured image of the front camera 3 or the detection result of the radar sensor 4. When it is determined that illumination target has been detected (YES in S30), the ECU 10 transitions to S31. When it is not determined that the illumination target has been detected (NO in S30), the ECU 10 ends the current spot illumination processing. Thereafter, the ECU 10 repeats the process again from S30 after a predetermined period of time has elapsed.

In S31, the ECU 10 determines whether the collision possibility between the vehicle and the illumination target is high by the collision possibility determination unit 16. The collision possibility determination unit 16 makes a determination based on the captured image of the front camera 3 or the detection result of the radar sensor 4. When it is determined that the collision possibility between the vehicle and the illumination target is high (YES in S31), the ECU 10 transitions to S33. When it is not determined that the collision possibility between the vehicle and the illumination target is high (NO in S30), the ECU 10 transitions to S32.

In S32, the ECU 10 performs spot illumination of normal light quantity by the spot illumination control unit 17. The spot illumination control unit 17 performs spot illumination on the illumination target by turning on an LED unit corresponding to an illumination angle corresponding to the position of the illumination target, for example. The spot illumination control unit 17 performs spot illumination on the illumination target with a normal amount of light. Thereafter, the ECU 10 ends the spot illumination processing.

In S33, ECU 10 provides information to a driver by the information providing unit 13. The information providing unit 13 notifies the driver of the presence of a pedestrian or the like as an illumination target by image display or sound output. The information providing unit 13 may highlight the illumination target by the HUD. The ECU 10 then transitions to S34.

In S34, ECU 10 performs spot illumination with increased light intensity by the spot illumination control unit 17. The spot illumination control unit 17 performs spot illumination on the illumination target by increasing the amount of light. Thereafter, the ECU 10 ends the spot illumination processing.

According to the vehicle control device 100 of the present embodiment described above, the horizontal width of the illumination range of the headlight is increased when the vehicle enters an area where the illumination target such as a pedestrian is highly likely to approach and the illumination target approach area condition is satisfied. In addition, when the vehicle control device 100 detects an illumination target such as a pedestrian, spot illumination is performed with respect to the illumination target. Therefore, in the vehicle control device 100, it is possible to reduce the oversight of the pedestrian of the driver at night by controlling the headlight. As a result, the vehicle control device 100 can alleviate the driver's feeling of unease in driving at night. Further, in the vehicle control device, the illumination target that has received the spot illumination is also likely to notice the presence of the vehicle.

In addition, according to the vehicle control device 100, the light amount of spot illumination with respect to the illumination target is increased when it is determined that the collision possibility between the vehicle and the illumination target is high compared to when it is not determined that the collision possibility between the vehicle and the illumination target is high. Therefore, the vehicle control device 100 makes it easy for the driver to visually recognize an illumination target having a high collision possibility. The vehicle control device 100 also makes it easier for an illumination target receiving spot illumination having with a large amount of light to notice the presence of the vehicle.

Further, according to the vehicle control device 100, it is determined that the illumination target approach area condition is satisfied when it is recognized that the vehicle is located within the illumination target approach area set on the map. Therefore, according to the vehicle control device 100, the lateral width of the illumination range of the headlight 7 is increased in a place where the pedestrian is likely to approach the vehicle, such as an urban area, and thus it is possible to reduce the chance of the driver failing to see the pedestrian. According to the vehicle control device 100, it is determined that the illumination target approach area condition is satisfied for a predetermined time after the road sign corresponding to the area determination image pattern is recognized from the captured image of the front camera 3. For this reason, according to the vehicle control device 100, the lateral width of the illumination range of the headlight 7 can be increased to reduce the driver's oversight of the pedestrian or the like when a road sign or the like provided in an urban area or the like where many pedestrians are present is recognized. Instead of the predetermined period of time, any period until the vehicle travels a predetermined distance may be set.

It is to be understood that not all aspects, advantages and features described herein may necessarily be achieved by, or included in, any one particular example. Indeed, having described and illustrated various examples herein, it should be apparent that other examples may be modified in arrangement and detail.

The vehicle control device 100 need not necessarily have the vehicle speed determination unit 11. The vehicle control device 100 may switch to wide light distribution or perform spot illumination regardless of the speed of the vehicle.

The vehicle control device 100 need not necessarily have the information providing unit 13. The vehicle control device 100 may switch to wide light distribution or perform spot illumination without notifying the driver.

The vehicle control device 100 need not necessarily have the collision possibility determination unit 16. The vehicle control device 100 may perform a predetermined amount of spot illumination with respect to the illumination target regardless of collision possibility.

The vehicle control device 100 may change the degree of expansion of the illumination range of the wide light distribution in accordance with the condition of the road on which the vehicle travels. The vehicle control device 100 may further increase the lateral width of the illumination range of the wide light distribution in a case where the width of the lane in which the vehicle travels is equal to or greater than a predetermined threshold, compared to a case where the lane width is less than the predetermined threshold. The vehicle control device 100 may further increase the lateral width of the illumination range of the wide light distribution when the vehicle is located near an intersection, compared to when the vehicle is located on the zone 30 of a straight road.

The vehicle control device 100 may switch between the normal light distribution and the wide light distribution not only for the high beam but also for the low beam. Also in the case of the low beam, the wide light distribution is performed such that the lateral width of the illumination range in which the light amount at the height of the 1 m is 10 lux or more is enlarged as compared with the normal light distribution.

What is claimed is:

1. A vehicle control device for controlling illumination of a headlight of a vehicle, the vehicle control device comprising:
    a controller configured to:
    determine whether a preset illumination target approach area condition is satisfied based on location information of the vehicle on a map and map information or based on a captured image of a front camera of the vehicle and an area determination image pattern;
    increase a horizontal width of an illumination range of the headlight when the controller determines that the illumination target approach area condition is satisfied compared to when the controller does not determine that the illumination target approach area condition is satisfied;
    detect an illumination target including a pedestrian in front of the vehicle based on the captured image of the front camera of the vehicle or a detection result of a radar sensor of the vehicle; and
    perform spot illumination with respect to the illumination target by the headlight when the illumination target is detected by the controller, wherein the controller is further configured to:
    adjust the illumination range of the headlight in accordance with a situation of the vehicle, including increasing the illumination range on a first side without increasing the illumination range on a second side when the vehicle is traveling on the first side, the first side including a road shoulder side, and the second side including an adjacent lane side and one of a plurality of lanes of a road;

perform wide light distribution in which the illumination range in a front-rear direction of the vehicle is shorter than that of a normal light distribution when the vehicle enters an intersection;

selectively provide information to a driver that the illumination target approach area condition is satisfied and based on the vehicle entering a vicinity of the intersection, including not provide the information to the driver when it is determined that the illumination target approach area condition is satisfied by the vehicle entering the vicinity of the intersection; and determine that the illumination target approach area condition is satisfied when recognizing that the vehicle is located within the illumination target approach area set on the map, the illumination target approach area including an area where a speed of the vehicle is limited to a predetermined value and a road section in which a number of contact cases within a predetermined period is equal to or greater than a predetermined threshold value based on data associated with the contact cases.

2. The vehicle control device according to claim 1, wherein the controller is further configured to:

determine whether a collision possibility between the vehicle and the illumination target is high based on the captured image of the front camera of the vehicle or the detection result of the radar sensor of the vehicle when the illumination target is detected by the controller, increase an amount of light of the spot illumination with respect to the illumination target when the controller determines that the collision possibility between the vehicle and the illumination target is high compared to when the controller does not determine that the collision possibility between the vehicle and the illumination target is high.

3. The vehicle control device of claim 1, wherein the controller determines that the illumination target approach area condition is satisfied for a predetermined period of time after recognizing a road sign or a road marking corresponding to the area determination image pattern from the captured image of the front camera or for a period of time after a road sign or road marking corresponding to the area determination image pattern has been recognized from the captured image of the front camera until the vehicle travels a predetermined distance.

4. The vehicle control device of claim 2, wherein the controller determines that the illumination target approach area condition is satisfied for a predetermined period of time after recognizing a road sign or a road marking corresponding to the area determination image pattern from the captured image of the front camera or for a period of time after a road sign or road marking corresponding to the area determination image pattern has been recognized from the captured image of the front camera until the vehicle travels a predetermined distance.

* * * * *